Nov. 3, 1936.　　　　S. F. REBORA　　　　2,059,911

TOASTER

Filed June 5, 1935

Inventor:
Stephen F. Rebora
By: Lee J. Gary
Attorney

Patented Nov. 3, 1936

2,059,911

UNITED STATES PATENT OFFICE 2,059,911

TOASTER

Stephen F. Rebora, Chicago, Ill.

Application June 5, 1935, Serial No. 25,048

6 Claims. (Cl. 219—19)

This invention relates to improvements in bread toasting devices and refers specifically to a toaster, particularly of the electric type, which is adaptable for the simultaneous toasting of one or a plurality of slices of bread, the toaster being characterized in that a maximum number of slices may be toasted simultaneously in a minimum of space, efficiency and rapidity of toasting not being sacrificed.

One of the important objects of my invention is to provide a toaster of the electric type which can be constructed economically and assembled with extreme facility, the device comprising essentially two main units which can be assembled with the least expenditure of time and labor.

Another important feature of my invention resides in a construction which permits the utilization to the utmost degree of the heat given off by the heating units, said heat being applied to the bread in a uniform and well distributed manner whereby uniformly toasted bread may be obtained in a minimum of time.

Other objects and advantages of my invention will be apparent from the accompanying drawing and following detail description.

Figure 1:
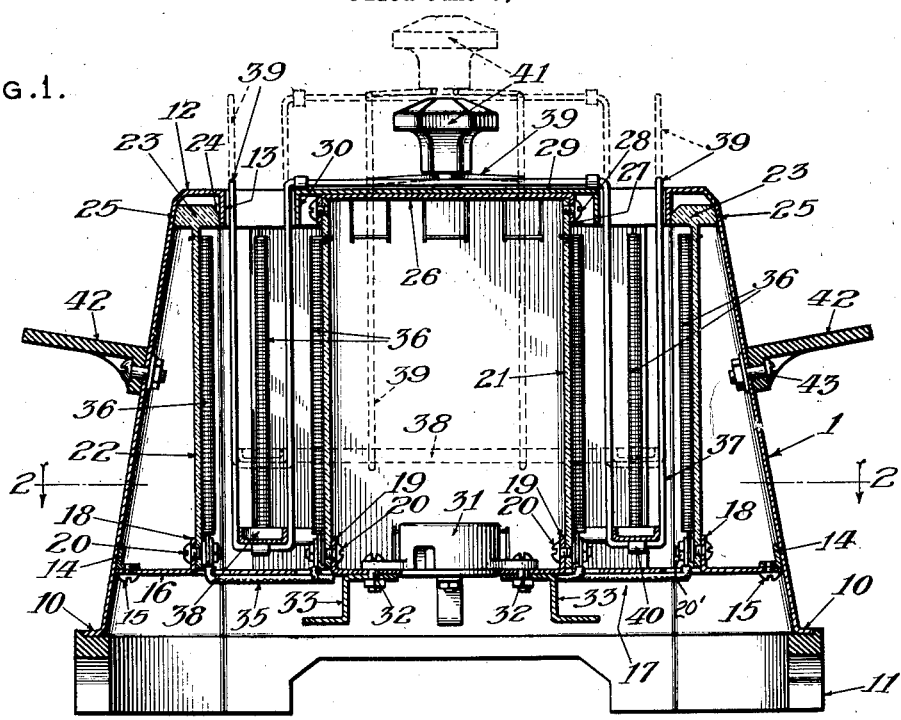

In the drawing, Fig. 1 is a vertical cross sectional view taken through my toaster.

Figure 2:
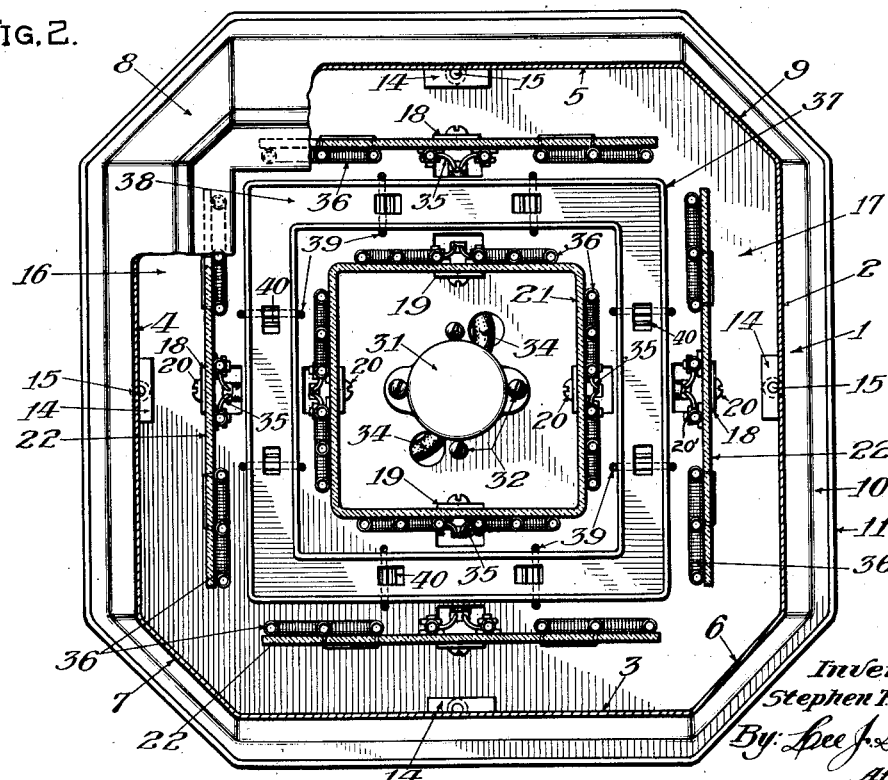

Fig. 2 is a sectional view taken on line 2—2 of Fig. 1, parts being shown in plan.

Referring in detail to the drawing, I indicates a metal shell which comprises a series of continuously joined side walls 2, 3, 4, and 5. As illustrated, the walls 2, 3, 4, and 5 define a frustro-pyramid, the joining corners of said walls being angled or mitred to form, in horizontal cross section, a polygon, partaking, because of the relative dimensions of the walls 2, 3, 4, and 5 with respect to the mitred walls 6, 7, 8, and 9, of the characteristics of a square. It is to be understood, of course, that if desired, the shell may be constructed with a square cross section having right-angled corners or said corners may be rounded. Further, if desired, walls 1, 2, 3, and 4 may be perpendicular instead of inclined. The lower edges of the shell walls may be flanged outwardly, as shown at 10 in Fig. 1, whereby said shell may be secured to a wood, hard rubber, "Bakelite" or similar type base 11 which conforms with the cross-sectional shape of the shell 1. The upper edges of the walls may be turned inwardly and downwardly, as shown at 12 and 13 in Fig. 1, whereby a square central aperture is provided at the top of the shell.

A lug 14 is secured by welding or brazing to the inner face of each of the walls 2, 3, 4, and 5, said lugs being apertured to receive screws 15 whereby a base plate 16 may be secured within said shell. As will be hereinafter more fully described, base plate 16 carries the electric heating elements, insulators, etc., which comprises a complementary unit designated generally at 17, to said shell with which it may be assembled or disassembled merely by manipulating screws 15.

As has been hereinbefore described, plate 16 comprises the base for the unit 17. A series of pairs of lugs 18 and 19 may be struck up from plate 16, said lugs being adapted to support the insulators upon which the electric heating elements are mounted. Each of the lugs 19 may be apertured to receive a screw 20. An insulating unit 21 constructed of porcelain, asbestos, mica or other electric insulating material which can withstand heat, may be secured to lugs 19 by means of screws 20. The insulating unit 21 may be constructed as a unit, that is, the walls thereof may be integrally joined to define a parallelepiped of square cross section, in which case the lower wall of each side is secured to each lug 19, or each lug may support an individual panel (not shown), which may be arranged in the form of a square.

An insulating panel 22 may be secured to each lug 18 by means of a screw 20 or the like, said panels being constructed of the same material comprising insulating unit 21. The panels 22 are arranged in the form of a square which circumscribes unit 21 and, if desired, said panels may be integrally joined (not shown) at their lateral edges similar to unit 21.

The upper edges of each of the panels 22 may terminate in a flange 23 which may extend in both directions from the plane of the panel. The upper edges of said flanges may be tapered, as shown at 24 and 25 in Fig. 1, whereby each panel 22 may be automatically spaced from the walls of the shell and maintained in desired spaced relationship with respect to the sides of unit 21, the provision of the tapers 24 and 25 permitting quick centering of the panels during assembly.

The upper edges of the walls comprising the insulating unit 21 may be joined together by means of plate 26, which may have downwardly extending peripheral flanges 27. Flanges 27 may be apertured to receive screws 28 by which means said flanges may be secured to the walls or panels comprising the unit 21. A cap 29 may be mounted upon plate 26, said cap extending beyond the edges of said plate and having overhanging flanges 30. Cap 29 may be secured to plate 26 by screws or other suitable fastening means.

The central portion of base plate 16 may be provided with an aperture over which a plug receptacle and junction box 31 may be positioned. The receptacle portion of the box 31 is adapted to receive the conventional prong plug (not shown) whereby said box may be connected by means of a two conductor cord (not shown) to a source of electric current. Junction box 31 may be secured to the upper face of plate 16 by means of bolts 32 which may extend downwardly through said plate and serve to secure brackets 33 to the lower face of said plate. Brackets 33 are substantially bayonet-shaped and are so disposed as to form a support or reel upon which the two conductor electric cord may be wound when the device is packed or being shipped or when the same is not being utilized.

A plurality of cables 34 carrying a plurality of conductors 35 may connect into junction box 31, conductors 35 being, in turn, connected to binding posts 20' mounted upon unit 21 and panels 22. Conventional electric resistance heating elements 36 may be carried on the insulating unit 21 and panels 22 and the terminals of said elements may be appropriately connected to the binding posts 20'.

It is to be understood that the heating elements 36 may be connected in series, in parallel or in series-parallel depending upon their resistance, the voltage used and the wattage desired. In addition suitable switches (not shown) may be interposed in the circuits whereby one or more pair of elements may be selectively energized. The electric circuits utilizable in my invention are conventional and constitute no part of my invention per se.

To assemble my device, it will be apparent that it is merely necessary to insert unit 17 within shell 1 and fasten the same therein by means of but four screws 15. When the toaster is so assembled, flanges 13 on the walls 2, 3, 4, and 5 define a square, and similarly flanges 30 on cap 29 also form a square, the latter flanges being spaced from the former whereby a continuous square slot is defined. This continuous slot provides an entrance into a toasting space for four slices of bread, which space is defined on each side by the heating elements 36.

To conveniently insert and remove the bread from the toasting space and also to maintain the bread when in the toasting space a proper distance from each set of heating elements, a frame or basket 37 is provided. The basket 37 comprises a continuous, square contoured trough 38 carried at the lower end of a wire frame 39. The wire frame 39 comprises two similar elements, each of which is bent so as to fit in opposite toasting spaces, the elements traversing, when the basket is in operative position, the top of cap 29. The two elements cross each other intermediate their length and are joined together at their juncture points by soldering, brazing or the like. The frame elements are adapted to carry the trough 38 at their lower bent portions, that is, those portions which are adapted to be inserted in the toasting space. To form a unitary structure of the basket, portions of the trough 38 are struck downwardly, as shown best at 40 in Fig. 2, the bent frame elements being positioned immediately beneath the apertures thus formed and the downwardly struck lugs being wrapped around or embracing the frame wire.

The combination of basket 37 together with the remaining instrumentalities of my device constitutes one of the important features of my invention. It will be seen that the heating elements which define each toasting compartment are spaced a predetermined distance from each other and this distance is greater than the distance between the flanges 13 and 30. It will also be seen that the flanges on the cap 29 or the defining edges of said cap guide or determine the lateral movement of the basket. Consequently, when bread is carried by the troughs 38, the wire frames carrying said troughs virtually form continuations of flanges 13 and 30 and properly space the slices of bread from the heating elements 36. In addition, the provision of the spaced flanges 13 and 30 guide the frame wires and prevent them from short circuiting the heating elements. In electric toasters heretofore devised, guide wires for preventing the bread from contacting the heating elements are built in the toaster itself and form fixed portions of the heating element supports. This introduces serious and expensive manufacturing difficulties which are obviated by my invention.

A knob 41 may be secured to the cross-portion of basket 37, said knob being constructed of a material having low heat conducting properties, such as a compressed asbestos composition or the like. By this means the basket carrying the bread slices may be inserted or removed from the toaster conveniently. Handles 42 may be secured to opposite side walls 2 and 4 by means of bolts 43 or the like, whereby the toaster as a whole may be conveniently moved from place to place. Handles 42 may be constructed of a material similar to knob 41.

I claim as my invention:

1. An electric bread toaster comprising in combination, a shell having laterally joined side walls, inwardly extending terminations of the upper edges of said walls defining a substantially square opening at the top of said shell, a heating unit removably positioned within said shell, said heating unit comprising a plate, a plurality of panels of insulating material carried by said plate, electric heating elements carried by said insulating panels, said panels defining a toasting space within said shell in which a plurality of slices of bread may be simultaneously toasted, the entrance to said space being defined by said inwardly extending terminations of the walls of the shell.

2. An electric bread toaster comprising in combination, a shell having laterally joined side walls, inwardly extending terminations of the upper edges of said side walls defining a substantially square opening at the top of said shell, a plate horizontally mounted in the lower portion of said shell, insulating panels carried by said plate, said panels being disposed in substantially the form of a square which projects within the square opening at the top of the shell, another series of insulating panels carried by said plate and spaced outwardly from said first mentioned panels, said inner and outer panels defining a plurality of compartments at substantially right-angles to each other, electric heating elements mounted upon the opposed faces of said inner and outer panels, and means for introducing and removing a plurality of slices of bread from said compartments.

3. An electric bread toaster comprising in combination, a shell having laterally joined side walls, inwardly extending terminations of the upper edges of said side walls defining a substantially square opening at the top of said shell, a plate horizontally mounted in the lower portion of said shell, insulating panels carried by said plate, said panels being disposed in substantially the form of a square which projects within the square opening at the top of the shell, another series of insulating panels carried by said plate and spaced outwardly from said first mentioned panels, said inner and outer panels defining a plurality of compartments at substantially right-angles to each other, electric heating elements mounted upon the opposed faces of said inner and outer panels, and means for introducing and removing a plurality of slices of bread from said compartments, said means comprising a wire frame so bent as to project into each of said compartments, and means carried by said projecting bent portions for holding a plurality of slices of bread in edgewise position.

4. An electric bread toaster comprising in combination, a shell having laterally joined side walls, inwardly extending terminations of the upper edges of said side walls defining a substantially square opening at the top of said shell, a plate horizontally mounted in the lower portion of said shell, insulating panels carried by said plate, said panels being disposed in substantially the form of a square which projects within the square opening at the top of the shell, another series of insulating panels carried by said plate and spaced outwardly from said first mentioned panels, said inner and outer panels defining a plurality of compartments at substantially right-angles to each other, electric heating elements mounted upon the opposed faces of said inner and outer panels, and means for introducing and removing a plurality of slices of bread from said compartments, said means comprising a wire frame so bent as to project into each of said compartments, means carried by said projecting bent portions for holding a plurality of slices of bread in edgewise position, and means for maintaining said projecting bent portions of the wire frame and the bread carried thereby in predetermined spaced relationship with respect to said inner and outer heating elements.

5. An electric bread toaster comprising in combination, a shell having laterally joined side walls, inwardly extending terminations of the upper edges of said side walls defining a substantially square opening at the top of said shell, a plate horizontally mounted in the lower portion of said shell, insulating panels carried by said plate, said panels being disposed in substantially the form of a square which projects within the square opening at the top of the shell, another series of insulating panels carried by said plate and spaced outwardly from said first mentioned panels, said inner and outer panels defining a plurality of compartments at substantially right-angles to each other, electric heating elements mounted upon the opposed faces of said inner and outer panels, and means for introducing and removing a plurality of slices of bread from said compartments, said means comprising a wire frame so bent as to project into each of said compartments, means carried by said projecting bent portions for holding a plurality of slices of bread in edgewise position, and means for maintaining said projecting bent portions of the wire frame and the bread carried thereby in predetermined spaced relationship with respect to said inner and outer heating elements, said means comprising a cap carried at the top of said inner insulators the edges of which define a square spaced predetermined distances in a vertical plane from the heating elements upon said inner insulating panels.

6. An electric toaster of the oven type comprising in combination, a shell having laterally joined side walls, inwardly extending terminations of the upper edges of said walls defining a substantially square opening, a heating unit comprising a plate, a plurality of spaced insulating panels carried by said plate, said insulating panels defining four heating compartments disposed in the form of a square, electric heating elements carried on opposed faces of said panels, a cap carried upon said panels within the inwardly extending terminations of the side walls and spaced therefrom to define slot entrances to said heating compartments, and means for removably mounting said heating unit within said shells.

STEPHEN F. REBORA.